June 15, 1965     J. F. HUTCHISON     3,189,311
OMNI-DIRECTIONAL LOAD TRANSFERRING RECEPTACLE DEVICE
Filed Dec. 17, 1963     2 Sheets-Sheet 1

JEFF F. HUTCHISON
*INVENTOR.*

BY *Charles T. Woodward*
ATTORNEY

June 15, 1965   J. F. HUTCHISON   3,189,311
OMNI-DIRECTIONAL LOAD TRANSFERRING RECEPTACLE DEVICE
Filed Dec. 17, 1963   2 Sheets-Sheet 2
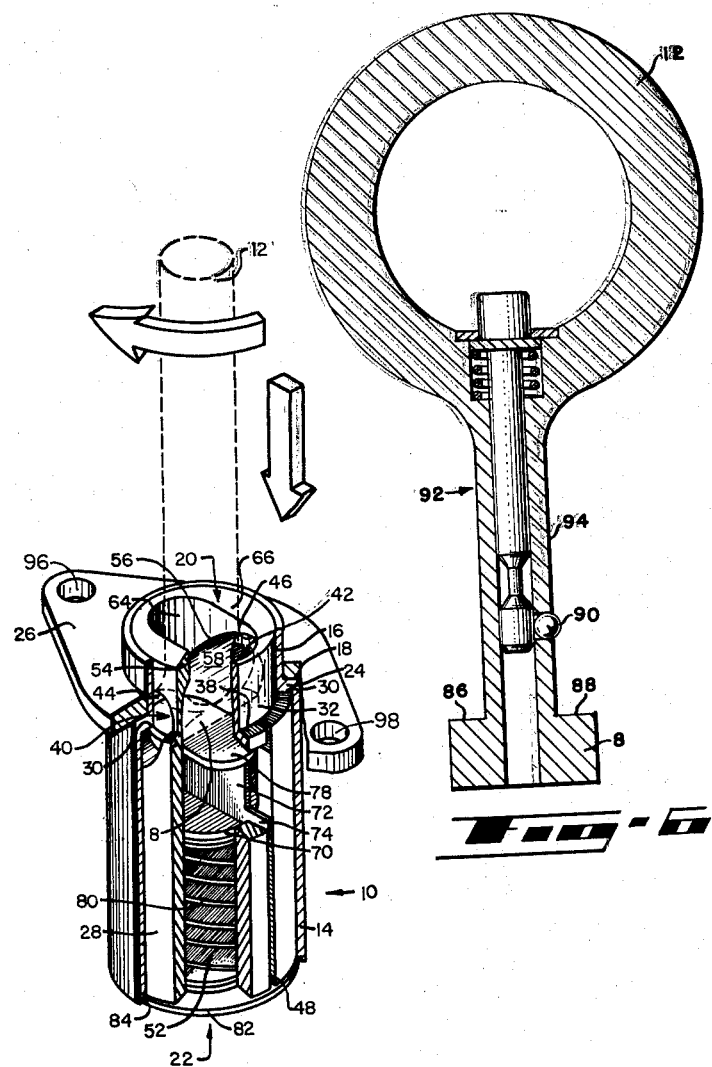
JEFF F. HUTCHISON
INVENTOR.
BY *Charles L. Woodward*
ATTORNEY ise; and has particular reference to small, relatively simple receptacles capable of effectively transferring high stress loads applied along substantially any imposed force line to a suitable structural member.

United States Patent Office 3,189,311
Patented June 15, 1965

3,189,311
OMNI-DIRECTIONAL LOAD TRANSFERRING RECEPTACLE DEVICE
Jeff F. Hutchison, Fort Worth, Tex., assignor to General Dynamics Corporation, San Diego, Calif., a corporation of Delaware
Filed Dec. 17, 1963, Ser. No. 331,288
7 Claims. (Cl. 248—361)

The present invention relates generally to fastening devices; and has particular reference to small, relatively simple receptacles capable of effectively transferring high stress loads applied along substantially any imposed force line to a suitable structural member.

More particularly the present invention relates to a compact, self-aligning, flush mounting receptacle having a rotatably arranged cylindrical retainer member incorporating enlarged load bearing journals, operative to receive and reliably retain a suitable attaching pin member therewithin; the retainer incorporates an annular bearing surface which cooperates with bearing surfaces in a body member, the bearing surfaces in conjunction with the aforementioned bearing journals permitting the imposition and retention of substantial loads.

Further, said receptacle possesses an extremely broad latitude of growth potetial due to its unique recessed construction and size, thus presenting an extremely extensive scope of employment from small cargo tie-down receptacles to heavy duty receptacles operative to support or retain large loads such as employment in hard points for hoisting naval aircraft aboard a carrier.

Several disadvantages are inherent in the receptacles presently available in the prior art, and deleterious effects result therefrom. Such receptacles employ a quick release ball-detent type pin as an attaching medium. Thus, in present devices of this type, the pin member, which is the elemental constituent of these fastening systems is dependent upon the tangential engagement of a retractable ball detent within the pin member for its retaining ability. Obviously, only a minute portion of the circumference of such ball detents contact and bear upon the peripherial shoulders incorporated within these receptacles, and thereby materially restrict the loads which can be safely applied thereto. This minute point contact between detent and peripheral shoulder results in an extremely concentrated load which is inductive to shearing out or failure.

Additionally, the receptacles of the prior art are not self-aligning. Thus, any force applied other than along the axial centerline induces a side load within the receptacle and attaching member, consequently creating a condition which tends to bend the attaching member or pry the receptacle from its mounting.

Another disadvantage of present receptacles resides in the facility to inadvertently actuate the release mechanism on the ball detent pin while the pin and receptacle are loaded. Obviously, such action may prove disastrous.

The present invention overcomes the deficiencies of the prior art by employment of an annular bearing surface within the receptacle body which cooperates with a similar bearing surface within a cylindrical retainer member, thereby effecting a considerably larger total bearing area and providing better distribution of imposed loads.

Further, the attaching medium employed by the present invention is received within suitable arcuate bearing journals incorporated within the rotatable retainer, thus providing the receptacle with a substantially omnidirectional load retaining capability which, consequently, precludes the development of stresses within the receptacle.

This ability to withstand loads is best exemplified by laboratory tests in which a receptacle of the present invention three quarters of an inch in diameter, constructed of 17-4 stainless steel, and a suitable quarter inch coupling element were employed. Tests were conducted in which the load was applied along the axial centerline of the receptacle, and others in which the load was applied at an angle of 20° to the axial centerline. In both cases, a tension load of 2000 lbs. was applied. The load was then released and the invented device was examined to determine if the swivel action or disconnecting or connecting of the coupling element had been impaired. It was not. The subject device was then subjected to 2500 lbs. load, the load was again released and the receptacle examined as before. This procedure was repeated at 500 pound increments until failure occurred. The receptacle's annular bearing surface within the retainer finally failed at the periphery during the straight pull test, but not until a total of 6060 pounds of load had been applied. In the instance in which the load was applied at 20° to the axial centerline, the receptacle failed as before, but only after a total of 6790 pounds was applied.

It is therefore the salient object of the present invention to provide a receptacle that is self-aligning, i.e., aligns itself to any imposed angular or rotational load.

Another object of the present invention is to provide a receptacle that has substantial bearing surface relative to a given size and commensurate with the strength of the inserted attachment member, yet possesses an extensive latitude of growth potential.

Still another object of the present invention is to provide a quick action, flush mounting, high load retaining receptacle which is adapted to receive a suitable attaching member or connector, which receptacle is positive locking in all conditions and cannot be inadvertently disengaged while loaded.

A further object of the present invention is to provide a relatively simple, self-sealing self-lubricating, load transferring receptacle which is substantially maintenance free.

Other objects and advantages of this invention will become readily apparent to those skilled in the art from a consideration of the following description, drawings, and appended claims. It should be further noted that the terms and expressions employed herein are terms of description and not limitation. No intention of excluding any equivalents of features shown or described, or portions thereof, should be ascribed thereto.

In the drawings:

FIGURE 5 is a perspective cut-away view of the present invention;

FIGURE 6 is an elevational view in cross-section of an embodiment of a rod type coupling element employing a detent.

Figure 1:
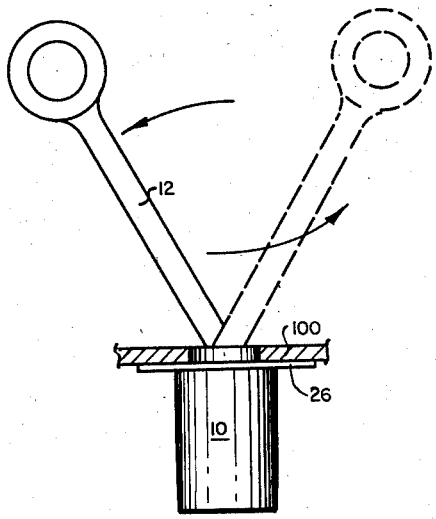
FIGURE 1 is an elevational view, partially in cross-section, of the present invention showing a typical flush mounted installation of the device within a structural member.
Figure 2:
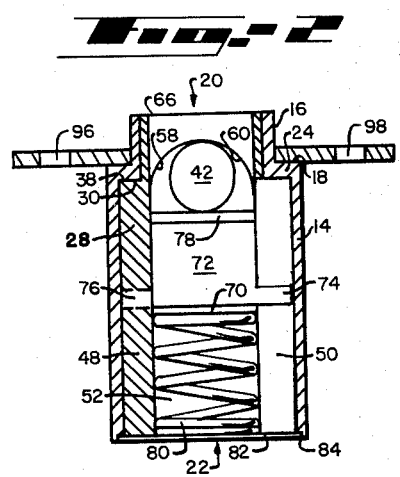
FIGURE 2 is an elevational cross-sectional view of the present invention in the locked position.

The preferred form of the present invention is best shown in its entirety by FIGURE 5, and comprises a receptacle structure 10 (FIGURE 1) for receiving a key type coupling element 12 having a circular T shaped detent 8 at one extremity, which detent engages chamfers (subsequently described) formed in the integral peripheral shoulder 54 incorporated in receptacle 10. Receptacle 10 comprises a hollow cylindrical body member 14 of a predetermined external diameter, which diameter may be proportional to the loads to be applied. Cylindrical body member 14 has an integral cylindrical end portion 16 of reduced external diameter. The differential in external diameters of the cylindrical portions 14 and 16 form at their junction a first external annular shoulder-like bearing surface 18 near one extremity of body member 14. The cylindrical body member 14 defines a first internal axial bore 20 therethrough (as best seen in FIGURES 2 and 5) and a second co-axial internal bore 22 of an increased diameter which bore 22 extends from the extremity furthest removed from external bearing surface 18 (FIGURE 2) to a hereinafter delineated predetermined point, said point defining that place at which internal bores 20 and 22 join. The differential in the respective diameters of internal axial bores 20 and 22 form a first internal annular shoulder-like bearing surface 30 at the aforesaid internal junction. This internal junction or internal bearing surface 30 is so positioned as to be adjacent, or in close proximity, to the above described first external annular bearing surface 18, defining therebetween a portion 24 operative to transmit upwardly imposed loads from bearing surface 30 to bearing surface 18. The load transmitting portion 24 is at least as thick as the circular walls defined by first and second internal coaxial bores 20 and 22 within cylindrical body member 14.

Body member 14 rotatably accommodates hollow cylindrical retainer member 28. Said retainer is of an external configuration and diameter substantially commensurate with the internal configuration of body member 14 as hereinabove described, thereby allowing said retainer member to be rotatably accommodated therewithin. Retainer 28 has a first external annular shoulder-like bearing surface 38 which corresponds to, physically contacts, and functionally cooperates with internal annular bearing surface 30 in body member 14.

Cylindrical retainer member 28 embodies two slightly elongated co-axial diametrically opposed first and second apertures 40 and 42, as best shown in FIGURES 2 and 5. The axis of these apertures is perpendicular to the axial axis of retainer element 28 and is vertically located at a point approximately along a line defined by the first external annular shoulder-like bearing surface 38. Cylindrical retainer element 28 also defines an internal axial bore 52 having an arcuate, integral dome-like end 32 which is located at a point along the axial centerline of the retainer and coincides with a line described by the apexes of the first and second elongated apertures 40 and 42, as best seen in FIGURE 2. Axial bore 52 extends from the arcuate dome-like end portion 32 to the extremity furthest removed from the arcuate end portion 32. Retainer 28 has a third elongated aperture 64 whose long axis is perpendicular to the common axis of the first and second elongated apertures 40 and 42, and passes through upper external surface 66 on the end of retainer 28, and extending to internal axial bore 52. The arcuate inner surface thus formed provides chamfers 56, 58, 60 (best seen in FIGURES 2 and 5) and 62 (not shown), one in each quadrant of the dome.

Further, the location of the common axis of the first and second apertures 40 and 42 relative to the axis, shape and vertical position of the third aperture 64 upon retainer 28 defines an area of increased thickness 54 between the first and second apertures 40 and 42 respectively and external upper surface 66, thereby forming load bearing journals or bearing blocks 44 and 46 whose bearing surfaces are defined by the upper half of the first and second apertures 40 and 42 respectively. Bearing blocks or journals 44 and 46 may have a suitable solid film lubricant such as molybdenum disulfide or the like, applied thereto. Further, retainer 28 defines slots located in diametrically opposed sides perpendicular to the common axis of the described first and second elongated apertures 40 and, these slots being in a plane which corresponds to the long axis of the third elongated aperture 64. These slots extend from the first annular external bearing surface 38 to the extremity furthest removed therefrom, thus forming guideways 48 and 50.

A cylindrical, washer-like spring retainer member 70 is slidably received within the above defined internal axial bore 52 in retainer 28. Spring retainer 70 has attached perpendicular to its upper surface a pedestal 72 (FIGURES 2 and 3) having one or more integral appendages such as 74 and 76 for slidable engagement within guideways 48 and 50. Pedestal 72 has affixed to it a foot member 78 which closes, under action of spring 80, the third elongated aperture 64 in cylindrical retainer 28.

Within the axial internal bore 52 adjacent to spring retainer 70 is positioned a resilient spring member 80. Retention of the components of the receptacle is effected by a disc-like cap element 82 secured by press fitting, soldering or the like, and may be positioned within a suitable annular recess 84 in one end of body member 14.

The receptacle incorporates a flange member 26 suitably apertured to permit its positioning (as best illustrated in FIGURE 2) upon the first annular bearing surface 18 in body member 14. Flange 26 may be secured in position by soldering, press fitting, or the like. Further, flange 26 is suitably apertured, as at 96, 98 in FIGURES 2 and 5, to permit its being mounted to a structural member 100.

The receptacle of the present invention is assembled in the following manner. Retainer 28 is positioned within internal axial bore 22 of body 14 and end portion 32 is received within end portion 16 of body 14 until annular external bearing surface 38 contacts internal annular bearing surface 30.

Figure 3:
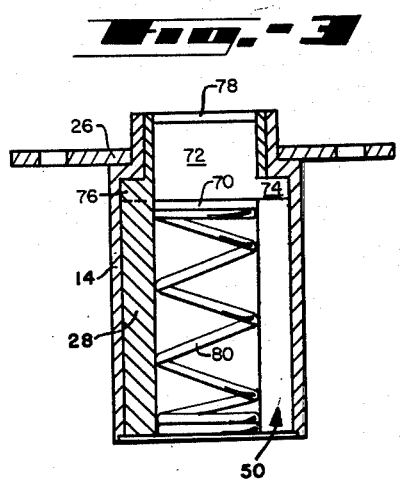
FIGURE 3 is an elevational cross-sectional view similar to FIGURE 2 of the present invention in the unlocked position.
Figure 4:
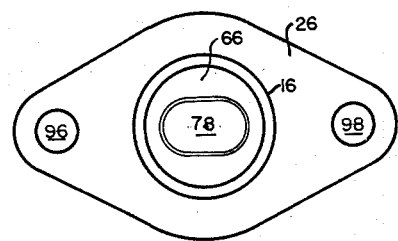
FIGURE 4 is a plan view of the device of the invention showing a typical mounting flange configuration.

Spring retainer 70 and foot member 78 having pedestal 72 therebetween are inserted into internal axial bore 52 in retainer 28 until foot member 78 closes elongated aperture 64 (as best seen in FIGURE 3) in retainer 28 and bottoms appendages 74 and 76 in guideway 48 and 50. Spring 80 is then inserted in internal axial bore 52 until it strikes spring retainer 70. The receptacle structure is then completed by the addition of disc-like cap element 82 which is received within annular recess 84 in body member 14, and the addition of flange 26 which is positioned over end portion 16 and seated on abutment 18.

In operation, T shaped coupling element 12 is inserted into receptacle 10 by depressing spring loaded foot 78 in elongated aperture 64 in retainer 28. Depressing foot 78 causes pedestal 72 and hence spring retainer 70 to be depressed toward the disc-like cap element 82. This movement results in the compression of spring 80 between spring retainer 70 and disc 82 in the bottom of the receptacle. Coupling element 12 is depressed to a point at which the T portion 8 is free to rotate 90 degrees to foot member 78 which is held in position by appendages 74 and 76 in guideways 48 and 50. Pressure is then released allowing coupling element 12 to rise until it is received within journals 44 and 46. The proper positioning of the T member 8 is assured in the preferred embodiment by sliding the T member over chamfers 56 and 58 or 60 and 62, depending on the direction of rotation, consequently camming T member 8 into the desired position.

This camming action in conjunction with the pressure applied by compressed spring 80 assures the entry of the T member into journals 44 and 46. The retention of the T member in this position is assured by the resiliency of spring 80. However, on application of sufficient pressure to coupling element 12 to effect the compression of spring 80, T member 8 may be depressed and rotated, hence allowing its removal from receptacle 10.

It should be noted that coupling element 12 is free to rotate within the body member 14 even when loaded due to the unique retainer 28–body member 14 relationship. Further, the coupling element is permitted to swing about the receptacle's vertical axis due to the substantially circular T member 8 which is restrained by journals 44 and 46, thus providing for rotational movement about the horizontal axis of first and second elongated apertures 40 and 42. The combination of these two movements provides the omni-directional load carrying capability of the present invention as illustrated in FIGURE 1.

Imposed loads are reacted through coupling element 12 by means of shoulders 86 and 88 on integral T member 8 which is engaged within journals 44 and 46. The load is reacted through the journals or bearing blocks to cylindrical retainer 28. Retainer 28 transfers the imposed load to internal bearing surface 30 of body member 14 by direct contact of bearing surface 38 in retainer 28. The load is then transferred to flange 26 by means of external bearing surface 18 in body member 14. The flange then reacts the load into structure 96 to which it is affixed.

It should be noted that coupling element 12 cannot be inadvertently released because the loads are imposed in a direction opposite to the force necessary to depress the coupling element. As previously detailed, depressing of the coupling element is required to allow rotation of the T member which is a prerequisite for disengagement. Further, the coupling element may employ a retractable ball detent 90, as illustrated in FIGURE 6, located in the side of shank 92 and so positioned as to be in close proximity to external surface 66 of retainer element 28 when T portion 8 is properly seated in journals 44 and 46. This retractable ball detent would be depressed in a manner commonly employed by most ball-lock pins. This retracting of ball detent 90 would allow its insertion and depression into receptacle 10. Upon seating T 8 in the journals in the manner hereinabove described, the detent would be forced through the wall 94 of shank 92 thereby creating a protrusion which would preclude its accidental depression, hence, its release.

Obviously, apertures 40 and 42 may be omitted in retainer member 28 in that they are primarily for tooling purposes in facilitating the forming of journals 44 and 46.

As thus described, the present invention allows an imposed load to be retained while simultaneously allowing the direction of the load imposition to be applied and moved throughout a conical path whose apex coincides with the axis of the coupling element T member.

What is claimed is:

1. A flush-mounting, self-aligning, omni-directional load transferring receptacle comprising:
   (A) a hollow body member having an end portion defining first omni-directional load transmitting means;
   (B) a hollow retainer member having means integral therewith for bearing cooperation with said body member load transmitting means,
       said retainer member also having means cooperative with said bearing means operative to retain a load imposing means and to transfer forces from the load imposing means to said retainer member; and
   (C) means cooperative with said retainer member operative to transfer said retainer member force to a structural element.

2. A self-aligning, high load retaining fastening device capable of transferring load applied along substantially any force line comprising, in combination:
   (A) a body member having an end portion of reduced dimensions,
       (1) said reduced dimension defining first load transferring means,
       (2) said body member defining first and second coaxial bores, said second bore being of greater transverse dimension than said first bore and defining second load transferring means,
   (B) a retainer member positionable within said body member,
       (1) said retainer member having means integral therewith for cooperation with said second load transferring means, and
       (2) means integral wtih said retainer member and operative as a bearing surface for retention of a load transferring means and to transfer forces imposed thereby;
   (C) means cooperative with said body member first load transferring means and operative to transfer loads imposed through said body member to adjacent structural members; and
   (D) a load transferring means removably, rotatably engaging said retainer member bearing surface.

3. A self-aligning, flush mounting, high load retaining receptacle for receiving a rotatable attaching member therewithin which is capable of reacting to and transferring high stress loads applied along substantially any imposed force line, comprising:
   (A) a hollow body member having an end of reduced dimension,
       (1) said reduced dimension definining an external load transferring means
       (2) said body member defining a first internal bore in the portion of reduced dimension, and
       (3) a second internal bore of larger dimension than said first and substantially co-axial therewith,
       (4) said bores forming a first internal load transferring means;
   (B) a hollow retainer member within said body member having means for cooperation with said first internal load transferring means, and
       (1) said retainer having a domed portion of increased thickness in the end thereof corresponding to, and cooperative with said reduced body member dimension,
           (a) a portion of said domed portion operative as a camming surface on a load imposing member positioned within said retainer,
           (b) an elongated aperture in said portion of increased thickness forming an access opening to the interior of said retainer for insertion and reception of a load imposing member, and
               operative as a bearing journal on imposition of a stress on the load imposing member,
       (2) said retainer having internal intergral means therewith for movably receiving and retaining a closure member;
   (C) a closure member having means for slideable engagement with said retainer means,
       said closure member having means operative therewith for resiliently biasing said closure member toward the closed position.

4. A self-aligning, high load retaining receptacle for receiving and securing a rotatable member therewithin, said receptacle capable of reacting to and transferring loads applied along substantially any imposed force line, comprising:
   (A) a cylindrical body member incorporating an end portion of reduced external diameter,
       (1) a first annular bearing surface formed between said differential diameters,
       (2) said body member having a first internal axial bore therethrough,
       (3) said body member having a second internal bore therethrough coaxial with said first bore of increased diameter extending from the extremity furthest removed from said first annular bearing surface to substantially said bearing surface, (4) said bores defining a first internal annular bearing surface and a portion therebetween operative to transmit imposed loads;

(B) a cylindrical retainer member having external diameters dimensionally commensurate with the internal configuration of said body member and operative to permit complete accommodation of said retainer member therewithin,
- (1) said retainer having a first external annular bearing surface cooperative with said body member first internal annular bearing surface,
  said first external annular retainer bearing surface operative to transmit imposed loads,
- (2) said retainer having first and second diametrically opposed co-axial apertures in the walls thereof,
- (3) said retainer defining an internal axial bore having a dome-like portion on one end,
- (4) said dome portion located at a point along the centerline of said retainer coinciding with a line described by the apexes of said elongated apertures, a portion thereof operative as camming surfaces in said end portion,
- (5) an aperture, having an axis perpendicular to the common axis of said first and second apertures, in the reduced end of said retainer forming communication to the interior of said retainer in the longitudinal axis thereof,
- (6) said first and second apertures defining, in conjunction with said third aperture, a portion of increased thickness between said first and second apertures and the retainer member upper external surface,
  said portion having an interior area operative as bearing journals whose bearing surface is defined by the upper portions of said first and second apertures,
- (7) opposed slots in a portion of the wall defined by said internal axial bore and perpendicular to the common axis of said first and second apertures,
  - (a) said slots being in a plane defined by the long axis of said third aperture
  - (b) said slots forming guideways extended from said first external annular bearing surface to the extremity furthest removed therefrom;

(C) a spring retainer element slideably received within said retainer member,
- (1) said spring retainer having a pedestal portion perpendicular to the upper surface thereof,
- (2) guideway engaging elements extended from said spring retainer and slideably received within said retainer guideways,
- (3) a foot-like element positioned on the free end of said pedestal and operative to close said third elongated aperture on release of the spring retainer,
- (4) a spring-like member positioned against said spring retainer and restrained within said retainer member, (D) a flange element operatively associated with said body member and abutting said first annular bearing surface thereof to transmit a load imposed upon said body member to associated structural members.

5. A flush mounting, self-aligning, high load retaining receptacle for receiving and securing a rotatable attaching member therewithin, said receptacle being capable of reacting to and transferring high stress loads applied along substantially any imposed force line, comprising:

(A) a hollow cylindrical body member, said cylindrical body member having an integral end portion of reduced external diameter, thus constituting different body diameters, said diameter differential forming at their junction a first annular shoulder-like bearing surface, said cylindrical body member having a first internal axial bore therethrough and a second co-axial internal bore of an increased diameter extending from the extremity furthest removed from said first external annular shoulder-like bearing surface to a point in close proximity to said first external annular shoulder-like bearing surface and defining a first internal annular shoulder-like bearing surface at their junction and a portion therebetween operative to transmit upwardly, imposed stresses, said body member also having at the extremity furthest removed from said reduced diameter end portion an internal annular recess;

(B) a hollow cylindrical retainer member having external diameters dimensionally commensurate with the internal configuration of said body member allowing complete and unobstructed accommodation therewithin, said retainer having a first external annular shoulder-like bearing surface which corresponds to said first internal annular shoulder-like bearing surface within said body member, said first external annular shoulder-like bearing surface cooperative with said first internal annular shoulder-like bearing surface and operative to effectively transmit imposed loads, said retainer having within diametrically opposed cylindrical walls first and second elongated co-axial apertures, wherein said first and second apertures common axis is perpendicular to the axial axis of said retainer and is vertically located at a point substantially along a line defined by said first external annular shoulder-like bearing surface in said retainer, said cylindrical retainer element having an internal axial bore, said bore being defined at one end by an arcuate dome-like portion forming an arcuate surface, said dome-like portion being located at a point along the axial center line of said retainer which coincides with a line described by the apexes of said first and second elongated apertures, said axial bore extends from said arcuate end to the extremity furthest removed from the integral reduced diameter end portions,
said retainer member having a third elongated aperture whose long axis is perpendicular to the common axis of said first and second elongated apertures and positioned within said upper external surface at the reduced end of said retainer extending to said internal axial bore, said arcuate inner surface constituting camming chamfers in each quadrant of said dome-like end, the location of the common axis of said first and second apertures relative to the axis, shape and vertical position of said third aperture upon said retainer defining a portion of increased thickness between said first and second apertures and said external upper surface, and forming load bearing journals whose bearing surface is defined by the upper half of said first and second apertures; said retainer having slots located in diametrically opposed sides thereof defining a plane which extends through the long axis of said third elongated aperture; said slots extending from said first external annular shoulder-like bearing surface to the extremity furthest removed therefrom and forming guideways;

(C) a cylindrical, washer-like spring retainer slideably received within said internal axial bore in said retainer, said spring retainer having attached to its upper surface a pedestal having at least one integral appendage for slideable engagement within said guideways, said pedestal having affixed to it a foot member which substantially closes said third elongated aperture of said cylindrical retainer;

(D) a spring member positioned adjacent to said spring retainer and operative to bias said spring retainer toward said third elongated aperture;

(E) a disc-like cap element positioned within said annular recess in said body for retention of said components; and
(F) a flange member apertured to permit its being positioned upon said first external annular shoulder-like bearing surface in said body member, said flange being operative to transmit loads from said receptacle to a structural member.

6. A self-aligning, flush-mounting, high load retaining fastening device capable of transferring stress loads applied in substantially any direction comprising in combination:
(A) a hollow, cylindrical body member having means forming a first external bearing surface and first and second axial bores of different diameters,
 (1) said second bore extending in substantially close proximity to said external bearing surface,
 (2) said bores defining means for transposing loads applied to said body member to support structure,
 (3) said hollow body member having closure means adjacent the end thereof furthest removed from the load imposing means;
(B) a cylindrical pin retainer member having external diameters corresponding to and commensurate with the internal configuration of said body member and receivable therewithin,
 (1) said retainer having means for cooperation with said body member load transposing means operative to transfer loads imposed thereon, and having opposed co-axial pin receiving recesses in the upper reduced portion thereof,
 (2) said retainer member having an upper axial bore defined at one end by a dome-like surface, said dome-like surface located at a point along the center line of said retainer which coincides with a line described by the apexes of said pin receiving recesses,
  said dome-like surface operable as a pin camming means,
 (3) said retainer member having in addition a means permitting insertion of a stress transmitting pin member therewithin for engagement with said pin receiving recesses,
 (4) means integral with said retainer member for slideably receiving an upwardly biased closure member,
(C) a closure member slideably receivable within said retainer operative to close the upper portion of said retainer on removal of said pin, said member being upwardly biased,
(D) means for securing said body member to adjacent structure operative to transfer stress loads imposed upon said body member to the structure, and
(E) a pin-like member having means integral therewith for cooperation with said pin receiving recesses, said member having means thereon permitting securement of articles thereto.

7. A self-aligning, flush-mounting, high load retaining fastening device capable of transferring stress loads applied in substantially any direction comprising in combination:
(A) a hollow, cylindrical body member,
 (1) said body member having means forming a first bearing surface, said means comprising
  an end portion of reduced diameter forming an external annular shoulder for cooperation with an attaching member, and
   (a) first and second co-axial bores of different diameter,
    said second bore extended to a point substantially adjacent said annular bearing shoulder,
   (b) said first and second bores in conjunction forming means for transposing stresses imposed upon said body member, said means comprising
    a first internal annular bearing surface, said bearing surface operative to transpose a load applied internally thereagainst to said external annular shoulder through the reduced body member wall,
(B) a hollow cylindrical pin retainer member having an external diameter corresponding to the internal configuration and receivable within said body member, and means for cooperation with said body member first internal annular bearing surface, said means comprising
 a first external annular bearing surface operative to transmit imposed loads to said body member, said bearing surface formed by the diametral difference between the end portion and the remainder of said retainer,
 (2) said retainer having opposed coaxial pin shoulder receiving recesses in said upper reduced portion thereof,
 (3) said retainer having first and second coaxial bores of different diameter,
  (a) said first bore defined at one end by a dome-like portion located at a point along the center line of said retainer member and coinciding with a line described by the apexes of said pin shoulder receiving recesses, a portion of the surface thereof operative to cam the shoulders of a stress transmitting pin into locked engagement with said pin shoulder receiving recesses
  (b) means in one end of said retainer member for positioning a stress transmitting means within said retainer, said means comprising
   (1) an elongated aperture extending from the upper outer surface of said retainer to and communicating with the first bore and intersecting said dome-like portion, so that the location of the common axis of said pin shoulder receiving recesses relative to a plane coinciding with the long axis of said elongated aperture defines a portion of increased thickness between said first and second apertures and said upper outer surface, said increased thickness portions defining bearing journals,
  (c) means integral with said retainer member for slideably receiving a closure member,
(C) a closure member slideably received within said retainer member and operative to close said elongated aperture,
(D) securing means operatively cooperative with said body member and support structure,
(E) a pin-like member having means thereon for locking rotatable engagement with said retainer member, said means comprising
 (1) a shaft having outwardly directed shoulder elements on one end thereof, said shoulder elements operable to rotatably engage said shoulder receiving recesses within said retainer member,
 (2) said shaft being apertured through the longitudinal axis, said aperture incorporating a means for biasing a locking actuator to the locking position, and
 (3) means operatively associated with said shaft and actuator for blocking engagement with said retainer member upper outer surface operative to block depression of said pin-like member.

References Cited by the Examiner

UNITED STATES PATENTS

| | | | |
|---|---|---|---|
| 2,729,417 | 1/56 | Maynard | 248—361 |
| 2,729,418 | 1/56 | Maynard | 248—361 |
| 2,969,023 | 1/61 | Chapman | 248—361 X |

FOREIGN PATENTS

| | | |
|---|---|---|
| 519,385 | 12/55 | Canada. |

CLAUDE A. LE ROY, *Primary Examiner.*